US012578592B2

(12) United States Patent
Adema

(10) Patent No.: US 12,578,592 B2
(45) Date of Patent: Mar. 17, 2026

(54) ADJUSTABLE FORCE TEMPLE ARMS FOR HEAD MOUNTED WEARABLE DEVICE

(71) Applicant: GOOGLE LLC, Mountain View, CA (US)

(72) Inventor: Daniel Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 371 days.

(21) Appl. No.: 18/188,902

(22) Filed: Mar. 23, 2023

(65) Prior Publication Data

US 2023/0314833 A1 Oct. 5, 2023

Related U.S. Application Data

(60) Provisional application No. 63/362,415, filed on Apr. 4, 2022.

(51) Int. Cl.
*G02C 5/20* (2006.01)
*G02B 27/01* (2006.01)
*G02C 5/22* (2006.01)

(52) U.S. Cl.
CPC .............. *G02C 5/20* (2013.01); *G02C 5/2236* (2013.01); *G02B 27/0149* (2013.01); *G02B 2027/0178* (2013.01)

(58) Field of Classification Search
CPC ........................... G02C 5/2236; G02C 5/2245; G02B 27/0149; G02B 2027/0178
See application file for complete search history.

(56) References Cited

U.S. PATENT DOCUMENTS

| | | | | |
|---|---|---|---|---|
| 5,671,036 A | * | 9/1997 | Huang ................. | G02C 5/2236 |
| | | | | 351/113 |
| 6,585,371 B1 | * | 7/2003 | Lin ....................... | G02C 5/2236 |
| | | | | 351/113 |
| 6,659,606 B1 | * | 12/2003 | Duppstadt ............ | G02C 13/001 |
| | | | | 351/158 |

(Continued)

FOREIGN PATENT DOCUMENTS

| | | | | |
|---|---|---|---|---|
| WO | WO-2004097500 A2 | * | 11/2004 | ........... G02C 5/2263 |
| WO | WO-2022262847 A1 | * | 12/2022 | ........... G02C 5/2254 |

OTHER PUBLICATIONS

Machine translation of WO2004097500 A2 retrieved electronically from PE2E Search Aug. 5, 2025 (Year: 2025).*

(Continued)

*Primary Examiner* — Cara E Rakowski
(74) *Attorney, Agent, or Firm* — Brake Hughes Bellermann LLP

(57) ABSTRACT

Systems and methods for adjusting a level of force exerted by the temple arm portions of a frame of a head mounted wearable device are provided. Hinge mechanisms that provide for the rotatable coupling of a temple arm portion to a rim portion of a frame of the head mounted wearable device, or glasses, may include a rotation mechanism that facilitates rotation of the temple arm portion relative to the rim portion, and a biasing mechanism that can be adjusted to apply a desired level of lateral force to a head of a user wearing the glasses. The hinge mechanisms may allow for adjustments to biasing rates and/or pre-load levels and/or amounts of temple arm portion rotation prior to engagement to adjust the applied force to desired levels and maintain user comfort.

20 Claims, 14 Drawing Sheets

(56)        References Cited

U.S. PATENT DOCUMENTS

| | | | |
|---|---|---|---|
| 7,150,049 B1 * | 12/2006 | Fitch | A47K 13/10 |
| | | | 4/246.1 |
| 2006/0209251 A1 * | 9/2006 | Kacavenda | G02C 5/2236 |
| | | | 351/153 |
| 2015/0355479 A1 * | 12/2015 | Chene | G02C 5/2227 |
| | | | 351/113 |
| 2023/0324715 A1 * | 10/2023 | Adema | G02C 5/2209 |

OTHER PUBLICATIONS

Machine translation of WO 2022262847 A1 retrieved electronically from PE2E Search Nov. 6, 2025 (Year: 2022).*

* cited by examiner

ADJUSTABLE FORCE TEMPLE ARMS FOR HEAD MOUNTED WEARABLE DEVICE

CROSS REFERENCE TO RELATED APPLICATION

This application claims the benefit to U.S. Provisional Application No. 63/362,415, filed Apr. 4, 2022, the disclosure of which is incorporated herein by reference in its entirety.

TECHNICAL FIELD

This description relates, in general, to head mounted wearable devices, and in particular, to head mounted wearable computing devices including a display device.

BACKGROUND

Eyewear in the form of glasses may be worn by a user to, for example, provide for vision correction, reduce the effect of sunlight and/or glare, provide a measure of safety, and the like. These types of eyewear are typically somewhat flexible and/or deformable, so that the eyewear can be manipulated to comfortably fit the user. In some situations, an ophthalmic technician may manipulate rim portions and/or temple arm portions of a frame of the eyewear, for example, through cold working the frame and/or heating and re-working the frame, to adjust the eyewear to meet the needs of a particular user. In some situations, this re-working of the frame may occur over time, through continued use/wearing of the eyewear by the user. Manipulation in this manner, due to the flexible and/or deformable nature of the material of the frame and/or the lenses of the eyewear, may provide a comfortable fit while still maintaining ophthalmic alignment between the eyewear and the user. In a situation in which the eyewear is a head mounted computing device including a display, such as, for example, smart glasses, this type of flexibility and/or deformation in the frame may cause inconsistent alignment of the display, or mis-alignment of the display. Inconsistent alignment, or mis-alignment of the display can result in inconsistent alignment, or mis-alignment of content output by the display, relative to an eye box, or field of view of the user. This may cause visual discomfort, particularly in the case of a binocular display. A frame having rigid, non-flexible components, while still providing some level of flexibility in certain portions of the frame to allow for some level of adjustment of fit, may maintain alignment of the display, and may be effective in housing electronic components of a head mounted computing device including a display.

SUMMARY

In one general aspect, a head mounted wearable device includes a frame, including a front frame portion; an arm portion coupled to the front frame portion; and a hinge mechanism rotatably coupling the arm portion to the front frame portion. The hinge mechanism includes a rotation mechanism coupled between the front frame portion and the arm portion to rotatably couple the arm portion to the front frame portion of the frame; a biasing mechanism coupled to the rotation mechanism and configured to exert a biasing force in response to rotation of the arm portion; and an adjustment mechanism coupled to at least one of the rotation mechanism or the biasing mechanism and configured to provide for adjustment of at least one of a biasing force exerted by the biasing mechanism; or a point of engagement of the biasing mechanism during rotation of the arm portion.

In some implementations, the rotation mechanism includes a barrel hinge coupled between the front frame portion and the arm portion; the biasing mechanism includes a leaf spring having a first end portion thereof coupled to the front frame portion of the frame, and a second end portion positioned corresponding to the arm portion; and the adjustment mechanism includes a collar that is movable along the arm portion.

In some implementations, the collar is movable to a plurality of positions along the arm portion, so as to selectively contact a corresponding portion of the second end portion of the leaf spring in response to rotation of the arm portion.

In some implementations, wherein the collar includes a contact portion configured to selectively contact the second end portion of the leaf spring as the arm portion rotates relative to the front frame portion to selectively engage the second end portion of the leaf spring.

In some implementations, the second end portion of the leaf spring is movable relative to the first end portion of the leaf spring.

In some implementations, the rotation mechanism includes a barrel hinge coupled between the front frame portion and the arm portion; the biasing mechanism includes a shaft coupled to the barrel hinge, and a compression spring coupled on a first portion of the shaft; and the adjustment mechanism includes a threaded collar threadably engaged with a second portion of the shaft and configured to move in first direction in response to rotation of the threaded collar in a first direction to increase a biasing force exerted by the compression spring, and to move in a second direction in response to rotation of the threaded collar in a second direction to reduce the biasing force exerted by the compression spring.

In some implementations, a flange is coupled to the arm portion, at a position corresponding to an end portion of the first portion of the shaft, wherein the compression spring is coupled on the first portion of the shaft between the flange and the threaded collar.

In some implementations, a first end portion of the compression spring abuts the flange, and a second end portion of the compression spring abuts the threaded collar.

In some implementations, in an at rest state of the biasing mechanism, a first end portion of the compression spring is spaced apart from the flange, and a second end portion of the compression spring abuts the threaded collar.

In some implementations, in an engaged state of the biasing mechanism, a first end portion of the compression spring abuts the flange, a second end portion of the compression spring abuts the threaded collar, and the compression spring is compressed between the flange and the threaded collar.

In some implementations, the compression spring is a variable rate coil spring having at least a first spring rate in a first portion of the compression spring associated with a first end portion of the compression spring, and a second spring rate in the second portion of the compression spring associated with a second end portion of the compression spring.

In some implementations, an engagement point of the biasing mechanism is adjustable based on a position of the threaded collar on the second portion of the shaft.

In some implementations, a friction element is positioned between a surface of the barrel hinge and a corresponding surface of the front frame portion, wherein the friction element is configured to output a damping force in response to rotation of the arm portion relative to the front frame portion.

In some implementations, the rotation mechanism, the biasing mechanism and the adjustment mechanism are incorporated into a bushing coupled between the front frame portion and the arm portion, the bushing including a first ring defining an outer surface of the bushing; a second ring concentrically arranged within the first ring; an elastomer biasing member positioned in a space between the first ring and the second ring; a pin concentrically arranged within the second ring; and an arm extending radially outward from an end portion of the second ring.

In some implementations, the elastomer biasing member is configured to exert a biasing force on the first ring and the second ring in response to rotation of the arm portion relative to the front frame portion of the frame.

In some implementations, in response to rotation of the arm portion relative to the front frame portion, an elastomer material of the elastomer biasing member is in a shear state that exerts corresponding shear forces on the first ring and the second ring.

In some implementations, a stopping mechanism is provided in the front frame portion, wherein the arm is configured to selectively engage the stopping mechanism during rotation of the arm portion, and corresponding rotation of the bushing, to selectively restrict rotation of the arm portion relative to the front frame portion.

In another general aspect, a hinge mechanism includes a rotation mechanism coupled between a front frame portion and an arm portion of a frame; a biasing mechanism coupled to the rotation mechanism and configured to exert a biasing force in response to rotation of the arm portion; and an adjustment mechanism coupled to at least one of the rotation mechanism or the biasing mechanism and configured to provide for adjustment of a biasing force exerted by the biasing mechanism; and a point of engagement of the biasing mechanism during rotation of the arm portion relative to the front frame portion.

In some implementations, the rotation mechanism includes a barrel hinge coupled between the front frame portion and the arm portion; the biasing mechanism includes a leaf spring having a first end portion thereof coupled to the front frame portion of the frame, and a second end portion positioned corresponding to the arm portion and movable relative to the first end portion; and the adjustment mechanism includes a collar that is movable along the arm portion, the collar including a contact portion configured to selectively contact the leaf spring during rotation of the arm portion relative to the front frame portion.

In some implementations, the rotation mechanism includes a barrel hinge coupled between the front frame portion and the arm portion; the biasing mechanism includes a shaft coupled to the barrel hinge, and a compression spring coupled on a first portion of the shaft; and the adjustment mechanism includes a threaded collar threadably engaged with a second portion of the shaft and configured to move in first direction in response to rotation of the threaded collar in a first direction to compress the compression spring and increase a biasing force exerted by the compression spring, and to move in a second direction in response to rotation of the threaded collar in a second direction to release the compression spring and reduce the biasing force exerted by the compression spring.

In some implementations, the rotation mechanism, the biasing mechanism and the adjustment mechanism are incorporated into a bushing coupled between the front frame portion and the arm portion, the bushing including a first ring defining an outer surface of the bushing; a second ring concentrically arranged within the first ring; an elastomer biasing member positioned in a space between the first ring and the second ring and configured to exert a biasing force on the first and second rings; a pin concentrically arranged within the second ring; and an arm extending radially outward from an end portion of the second ring.

The details of one or more implementations are set forth in the accompanying drawings and the description below. Other features will be apparent from the description and drawings, and from the claims.

DETAILED DESCRIPTION

Figure 1A:
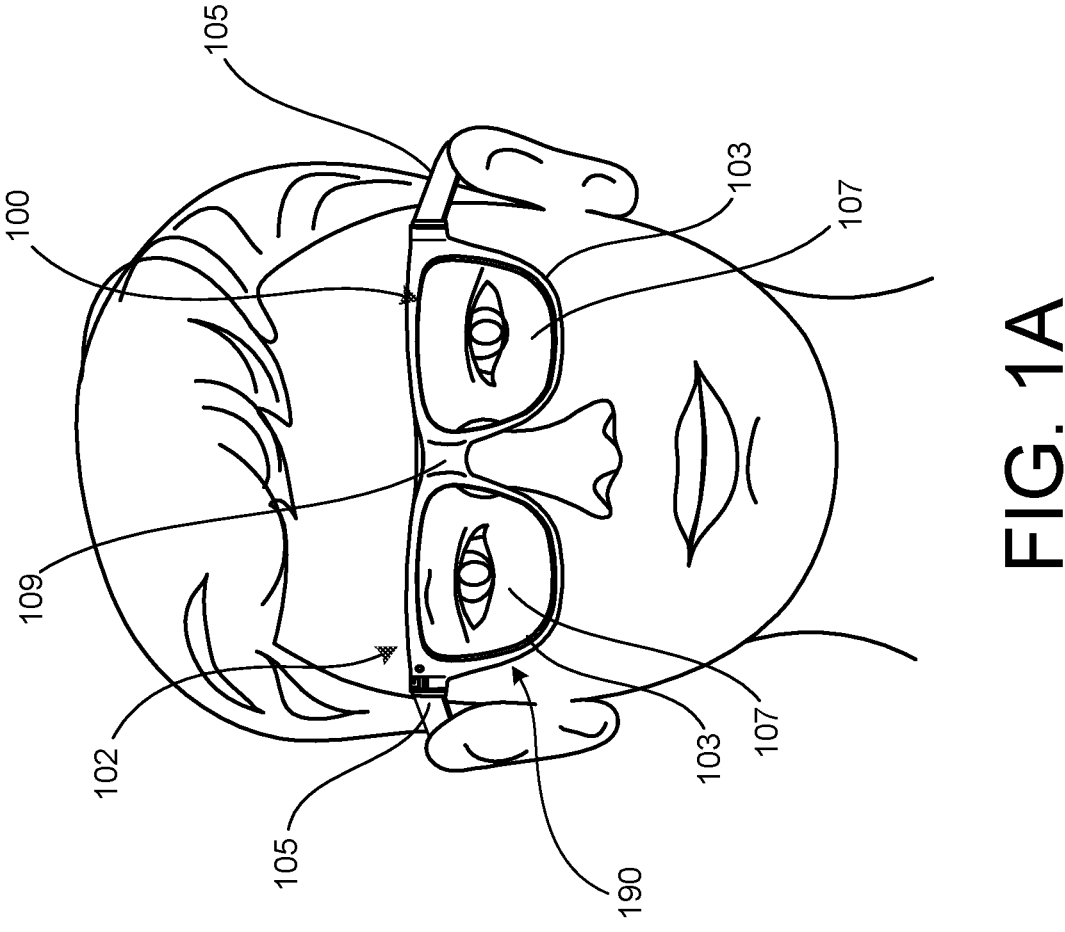
FIG. 1A illustrates an example system, in accordance with implementations described herein.

This disclosure relates to mechanisms for eyewear that allow for adjustment of force between a temple arm portion and a corresponding rim portion of a frame of the eyewear. In eyewear incorporating such mechanisms, adjustment of the force between the temple arm portions and the rim portion may allow a lateral force applied by the temple arm portion against the head of the user to be sufficient to maintain a position of the eyewear on the head of the user, while maintaining user comfort. In some examples, the mechanisms include one or more adjustment mechanisms that provide for adjustment of a biasing rate between the temple arm portion and the corresponding rim portion of the front frame portion of the frame of the eyewear. In some examples, the mechanisms provide for adjustment of a spring pre-load between the temple arm portion and the corresponding rim portion of the frame of the eyewear. In some examples, the mechanisms provide for adjustment of an angle of rotation between the temple arm portion and the corresponding rim portion of the frame of the eyewear prior to engagement of a spring member selectively engaged between the temple arm portion and the corresponding rim portion of the frame of the eyewear.

Eyewear, or glasses, are typically somewhat flexible and/or deformable, so that the eyewear can be manipulated to adapt to a particular head size and/or shape, a particular arrangement of features, a preferred pose of the eyewear on the face, a position of the eyewear on the nose, and the like, associated with a user, to provide a comfortable fit for the user. For example, a frame of the eyewear can be deformed by, for example, heating and re-forming plastic frames, bending and/or flexing frames made of other materials, and the like. Thus, flexible or deformable characteristics of the material of the frame of the eyewear may allow the eyewear to be customized to fit a particular user, while still maintaining the functionality of the eyewear.

In a situation in which the eyewear is in the form of smart glasses including display capability, computing/processing capability, and the like, a flexible or deformable frame may not provide the desired structural support for electronic components coupled to and/or housed in the frame. A flexible or deformable frame may not provide for and/or maintain alignment of the display with an eye box and/or output coupler that would otherwise ensure that content output by the display is visible by the user. Thus, in some situations, at least some portions of the frame of a pair of smart glasses may be made of rigid materials and/or components. In particular, in some situations, some portions of the frame of the smart glasses may be rigid, with some flexibility in certain portions of the frame to provide for physical adjustment and/or fit for the user. Flexibility in some portions of the frame, while maintaining rigidity in other portions of the frame, may provide for the alignment of the display, and secure installation of the electronic components, while also providing for some adjustment for physical fit on the user. In some examples, the frame of the smart glasses may include some level of flexibility at a nose bridge portion that bridges two rim portions of the frame respectively holding glass portions, or lenses. In some examples, the frame of the smart glasses may include some level of flexibility at pivot points, or points of rotation between the rim portions and temple arm portions. In some examples, the frame of the smart glasses may include some level of flexibility at ends of the temple arm portions corresponding to ear saddle points of the user.

In some examples, it may be desirable to maintain rigidity in the frame of the smart glasses along a front frame portion of the frame. The front frame portion may include, for example, the rim portions connected by the bridge portion. Rigidity in the front frame portion may help to achieve the desired alignment of the display with the eye box and/or output coupler, and the desired quality level of content that is output by the display and visible to the user. While rigidity in the front frame portion of the frame may provide for more consistent display alignment, this may rely on a greater number of sizes and/or configurations and/or models of frames to provide a proper, and comfortable fit across the spectrum of smart glasses users. Flex at the bridge portion and at the points of rotation coupling the temple arm portions to the front frame portion of the frame follow a substantially linear profile. As the temple arm portions are spread further apart, for example to accommodate an increased head width, a force applied to the sides of the head of the user increases. At a certain point, a level of resisting force imparted on the user's head will lead to user discomfort.

Figure 1B:
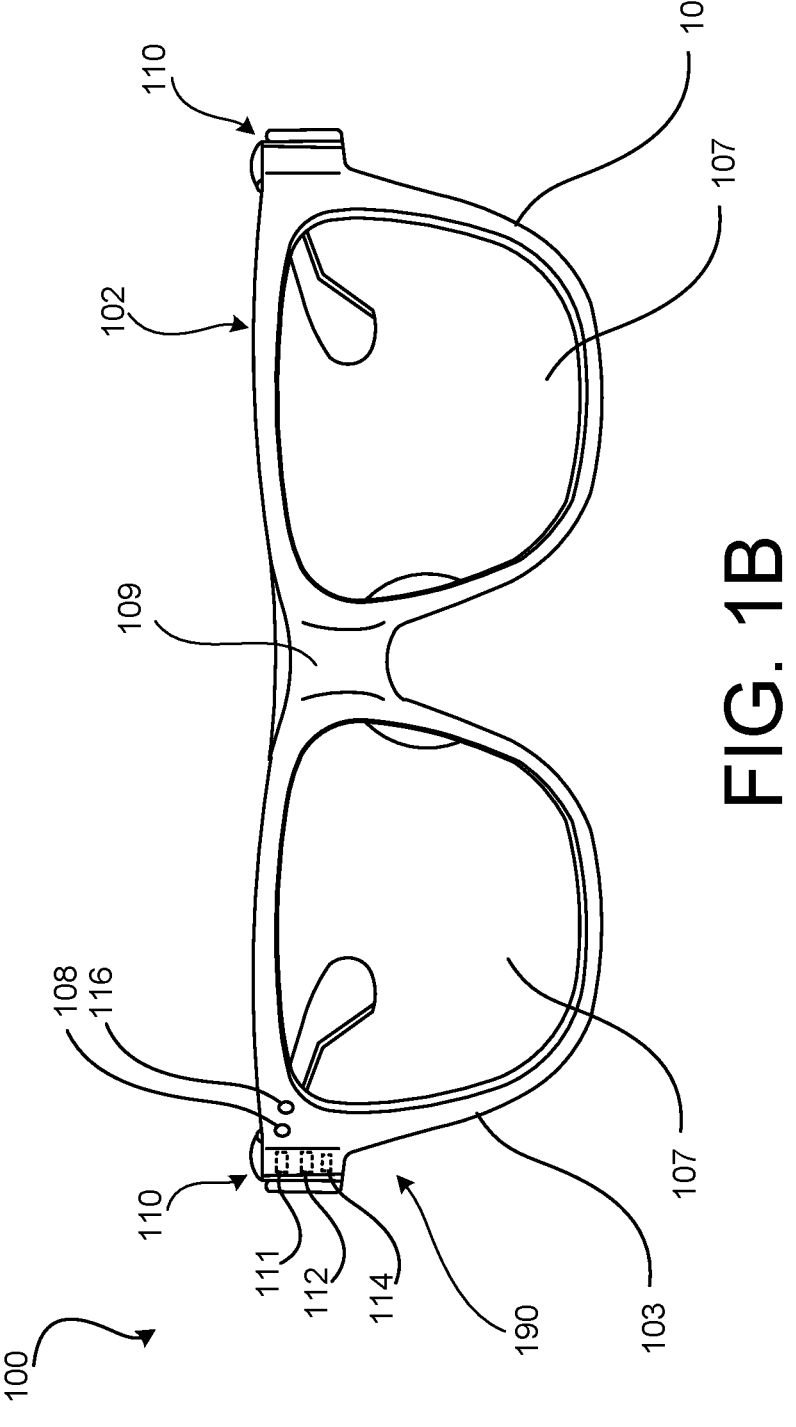
FIG. 1B is a front view.
Figure 1C:
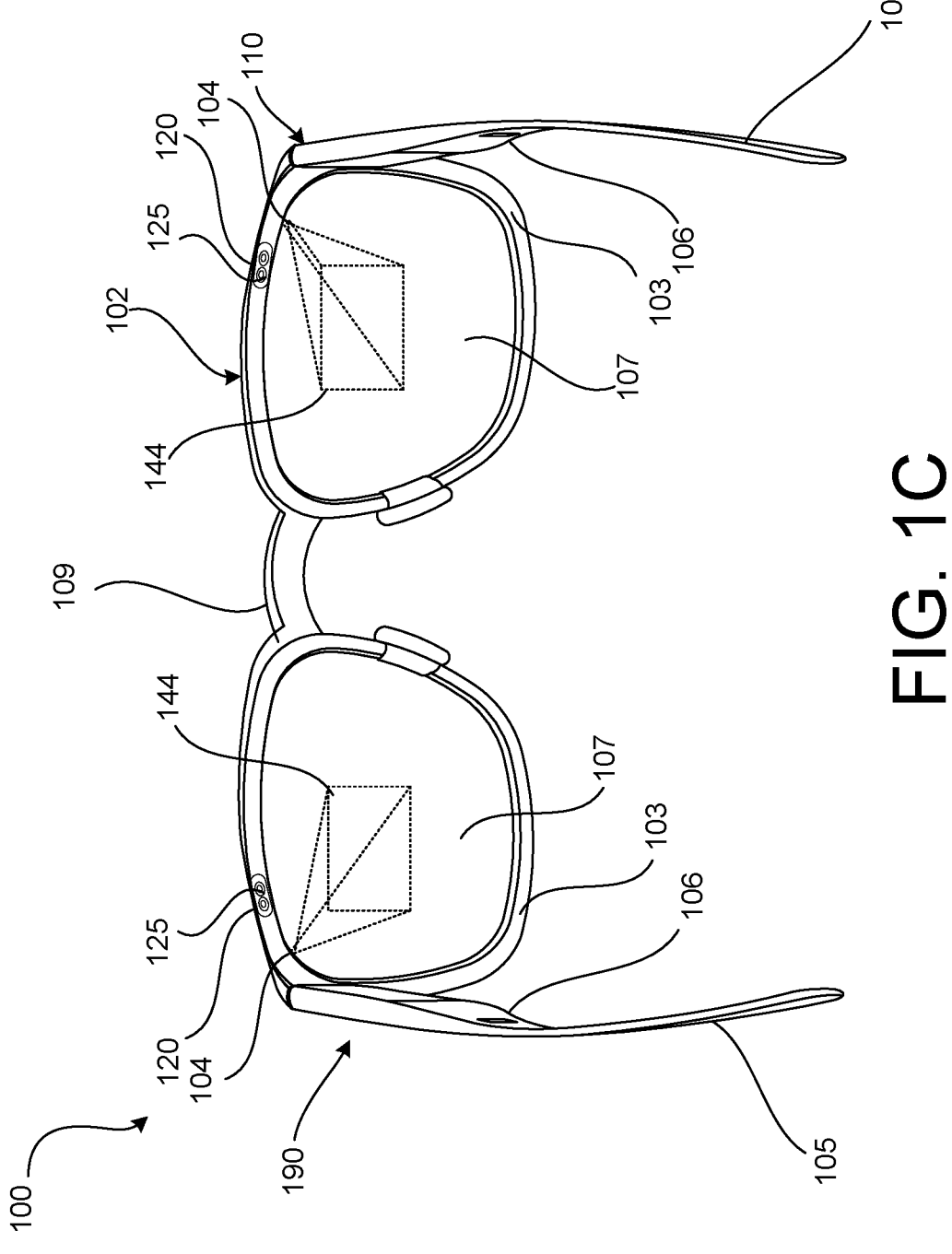
FIG. 1C is a rear view.
Figure 1D:
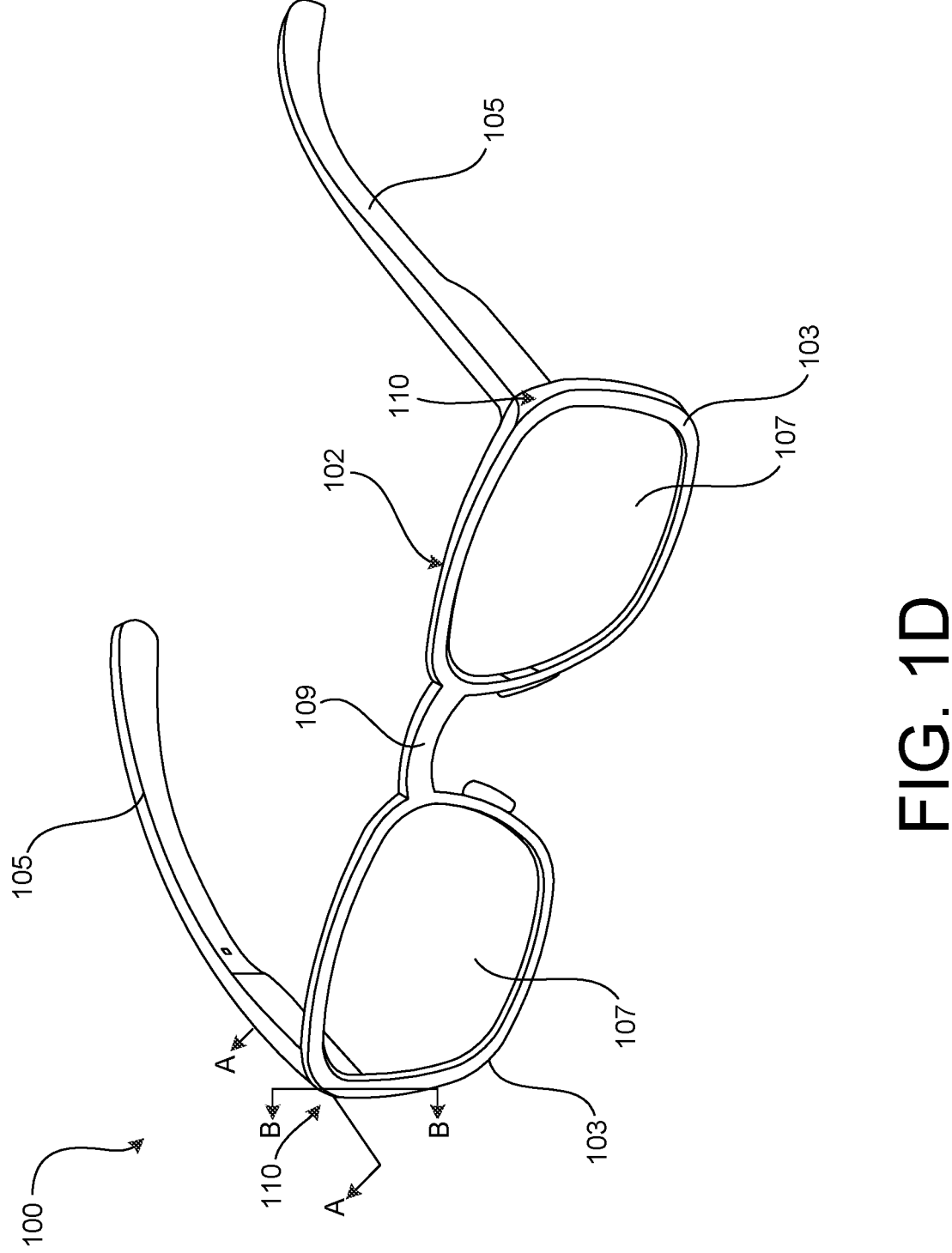
FIG. 1D is a perspective view, of an example head mounted wearable device shown in FIG. 1A, in accordance with implementations described herein.

FIG. 1A illustrates a user wearing an example head mounted wearable device 100. In this example, the example head mounted wearable device 100 is in the form of example smart glasses including display capability and computing/processing capability, for purposes of discussion and illustration. The principles to be described herein may be applied to other types of eyewear, both with and without display capability and/or computing/processing capability. FIG. 1B is a front view, FIG. 1C is a rear view, and FIG. 1D is a perspective view, of the example head mounted wearable device 100 shown in FIG. 1A. As noted above, in some examples, the example head mounted wearable device 100 may take the form of a pair of smart glasses, or augmented reality glasses.

As shown in FIG. 1B-1D, the example head mounted wearable device 100 includes a frame 190. The frame 190 includes a front frame portion 102. The front frame portion 102 is defined by rim portions 103 surrounding respective optical portions in the form of lenses 107, with a bridge portion 109 connecting the rim portions 109. Arm portions 105 are coupled, for example, pivotably or rotatably coupled, to the front frame portion 102 by hinge portions 110 at the respective rim portion 103. In some examples, the lenses 107 may be corrective/prescription lenses. In some examples, the lenses 107 may be an optical material including glass and/or plastic portions that do not necessarily incorporate corrective/prescription parameters.

In some examples, a display device 104 may be coupled in a portion of the frame 190 to output content for viewing by the user at one or both of the lense(s) 107. An eye box may extend toward one or both of the lens(es) 107, for output of content at an output coupler 144 at which content output by the display device 104 may be visible to the user. In some examples, the output coupler 144 may be substantially coincident with the lens(es) 107. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

In some examples, the head mounted wearable device 100 may include at least one gaze tracking device 120. The at least one gaze tracking device 120 may include one or more sensors 125, to detect and track eye gaze direction and movement. Data captured by the sensor(s) 125 may be processed to detect and track gaze direction and movement as a user input. In some examples, multiple gaze tracking devices 120 may track gaze direction and movement of both eyes of the user.

In some examples, the head mounted wearable device 100 can also include an audio output device 106 (such as, for example, one or more speakers), an illumination device 108, a sensing system 111, a control system 112, at least one processor 114, and an outward facing image sensor 116, or camera 116. In some examples, the sensing system 111 may include various sensing devices and the control system 112 may include various control system devices including, for example, one or more processors 114 operably coupled to the components of the control system 112. In some examples, the control system 112 may include a communication module providing for communication and exchange of information between the wearable computing device 100 and other external devices.

Figure 2A:
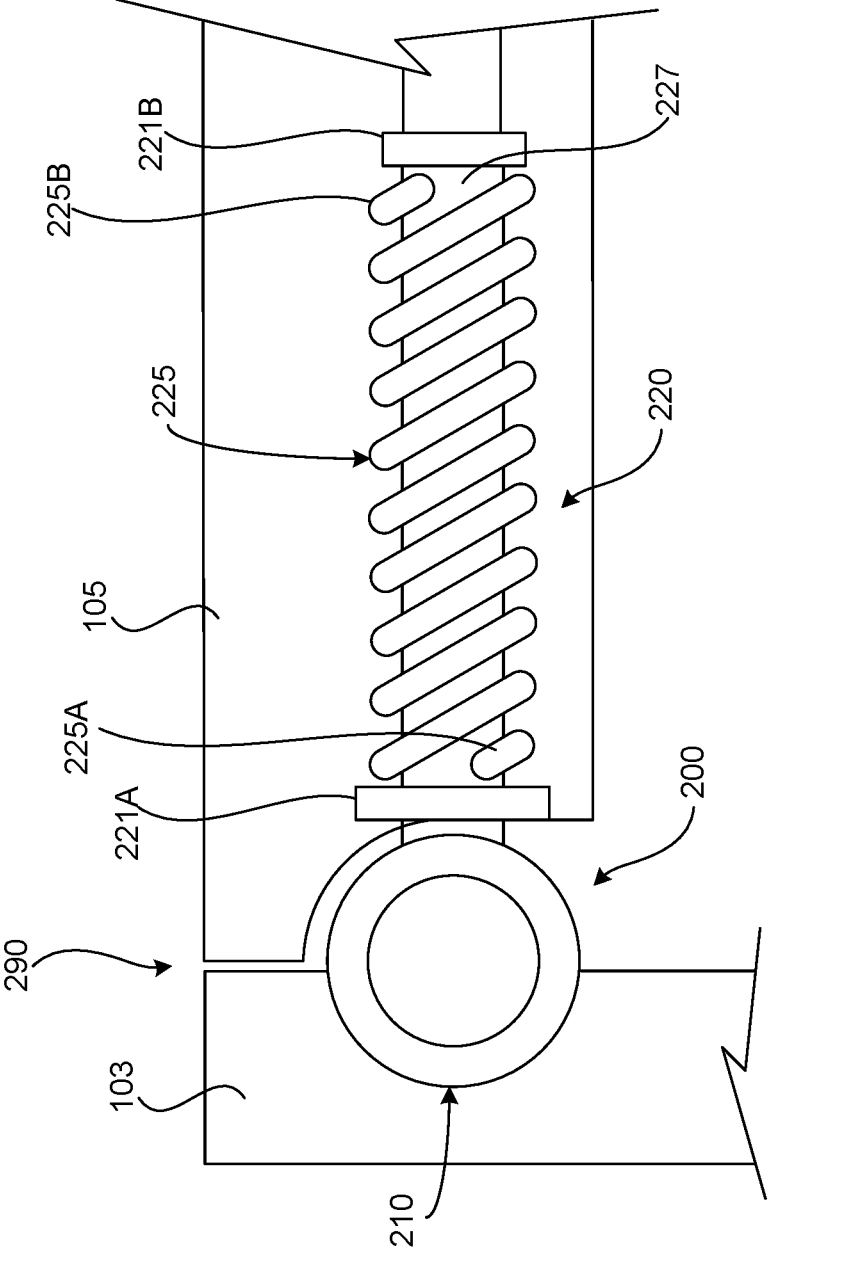
FIGS. 2A and 2B illustrate an example hinge mechanism for use in a head mounted wearable device, in accordance with implementations described herein.
Figure 2B:
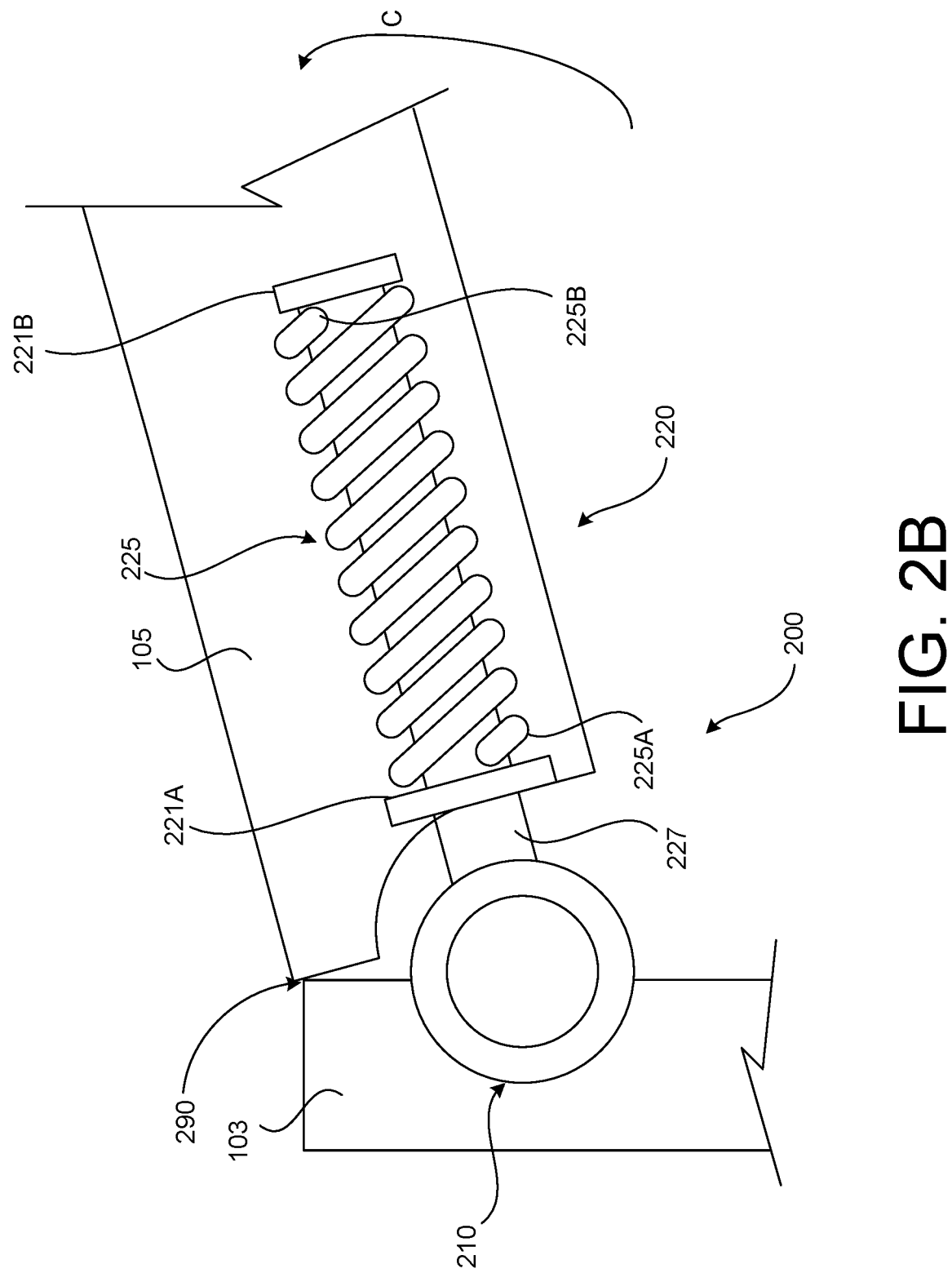

FIGS. 2A and 2B are cross-sectional views taken along line A-A of FIG. 1D, illustrating interaction between the rim portion 103 and the temple arm portion 105 at the hinge portion 110 of the frame 190. In particular, FIGS. 2A and 2B are schematic diagrams illustrating a top-down view of the hinge portion 110, taken through corresponding portions of the rim portion 103 and the temple arm portion 105, just above a position of an example hinge mechanism 200 coupling the rim portion 103 and the temple arm portion 105. In the example arrangement shown in FIGS. 2A and 2B, the example hinge mechanism 200 is coupled between the rim portion 103 and the temple arm portion 105 of the frame 190, allowing the temple arm portion 105 to rotate relative to the rim portion 103. The example arrangement shown in FIGS. 2A and 2B illustrates operation of the example hinge mechanism 200 at the hinge portion 110 defined between one of the rim portions 103 and the corresponding temple arm portion 105. The principles to be described herein can be similarly applied to the hinge portion 110 defined between the other of the rim portions 103 and the corresponding temple arm portion 105.

The example hinge mechanism 200 includes a rotation mechanism 210, and a biasing mechanism 220 coupled to the rotation mechanism 210. The rotation mechanism 210, in the form of a barrel hinge in the example shown in FIGS. 2A and 2B, provides for rotation of the temple arm portion 105 relative to the rim portion 103. The biasing mechanism 220 includes a shaft 227 that is coupled to the rotation mechanism 210 and extends into an interior of the temple arm portion 105. In some examples, the shaft 227 extends into a hollow, or partially hollow, interior portion defined within the temple arm portion 105. A biasing member 225 is fitted on the shaft 227. In the example arrangement shown in FIGS. 2A and 2B, the biasing member 225 is in the form of a coiled compression spring fitted on the shaft 227. A first end 225A of the biasing member 225 abuts, or is fixed to a first flange 221A, and a second end 225B of the biasing member 225 abuts, or is fixed to a second flange 221B. In the example arrangement shown in FIGS. 2A and 2B, the first flange 221A is coupled to an interior of the temple arm portion 105, and is movable along the shaft 227. The second flange 221B is fixed at an end of the shaft 227 opposite the rotation mechanism 210.

FIG. 2A illustrates the hinge portion 110 of the frame 190 and the hinge mechanism 200 in an essentially at rest position. FIG. 2B illustrates an example arrangement in which the temple arm portion 105 has rotated in the direction of the arrow C to, for example, accommodate a width of the user's head when the head mounted wearable device 100 is worn by the user. In the example arrangement shown in FIG. 2B, a width of the user's head may be greater than a width of a front frame portion 102 of the frame 190 (i.e., a width extending across the two rim portions 103 and the bridge portion 109 of the frame 190). In response to the rotation of the temple arm portion 105 in the direction of the arrow C, the biasing member 225 is compressed as the first flange 221A together with the temple arm portion 102, and thus moves along the shaft 227. In the arrangement shown in FIGS. 2A and 2B, rotation of the temple arm portion 105 relative to the rim portion 103 is limited, or restricted by a stopping mechanism 290. In the example shown in FIGS. 2A and 2B, rotation of the temple arm portion 105 relative to the rim portion 103 is restricted, or limited, or maintained within a set angle, or a set range of rotation, by the stopping mechanism 290, as an end portion of the temple arm portion 105 abuts a corresponding end portion of the rim portion 103, thus restricting further rotation of the temple arm portion 105.

The example hinge mechanism 200 shown in FIGS. 2A and 2B may provide for some level of flexibility at the hinge portion 110, while maintaining rigidity of the front frame portion 102 of the frame 190 and/or maintaining rigidity of the temple arm portions 105 of the frame 190. The biasing member 225 of the example hinge mechanism 200 shown in FIGS. 2A and 2B may exert a force the head of the user at the temple arm portion 105 to maintain the head mounted wearable device 100 in a particular position on the head of the user. However, the hinge mechanism 200 lacks a mechanism for adjusting the biasing force applied by the biasing member 225 and/or the point during rotation of the temple arm portion 105 at which the biasing member 225 is engaged. The biasing member 225 of the hinge mechanism 200 shown in FIGS. 2A and 2B is a constant rate compression spring having a substantially linear biasing rate, or spring rate, causing the force applied to the user's head to increase as the temple arm portion 105 rotates further in the direction of the arrow C. Thus, the hinge mechanism 200 provides only a limited amount of flexibility prior to engagement of the biasing mechanism 200, resulting in a potentially uncomfortable amount of force exerted on the head of the user by the temple arm portion 105. Further, as the biasing member 225 is engaged through essentially all of the rotational movement of the temple arm portion 105, biasing, or resistance generated by the biasing mechanism 220 cannot be delayed and/or adjusted for fit for a particular user.

A hinge mechanism, in accordance with implementations described herein, may include one or more adjustment mechanisms that provide for adjustment of a biasing rate, or a biasing force, provided by a biasing member of the hinge mechanism. In some examples, the hinge mechanism may include one or more mechanisms that provide for adjustment of a biasing pre-load. In some examples, the hinge mechanism may include one or more mechanisms that provide for some amount of rotation of the temple arm portion 105 of the frame 190 prior to engagement of the biasing member.

Figure 3A:
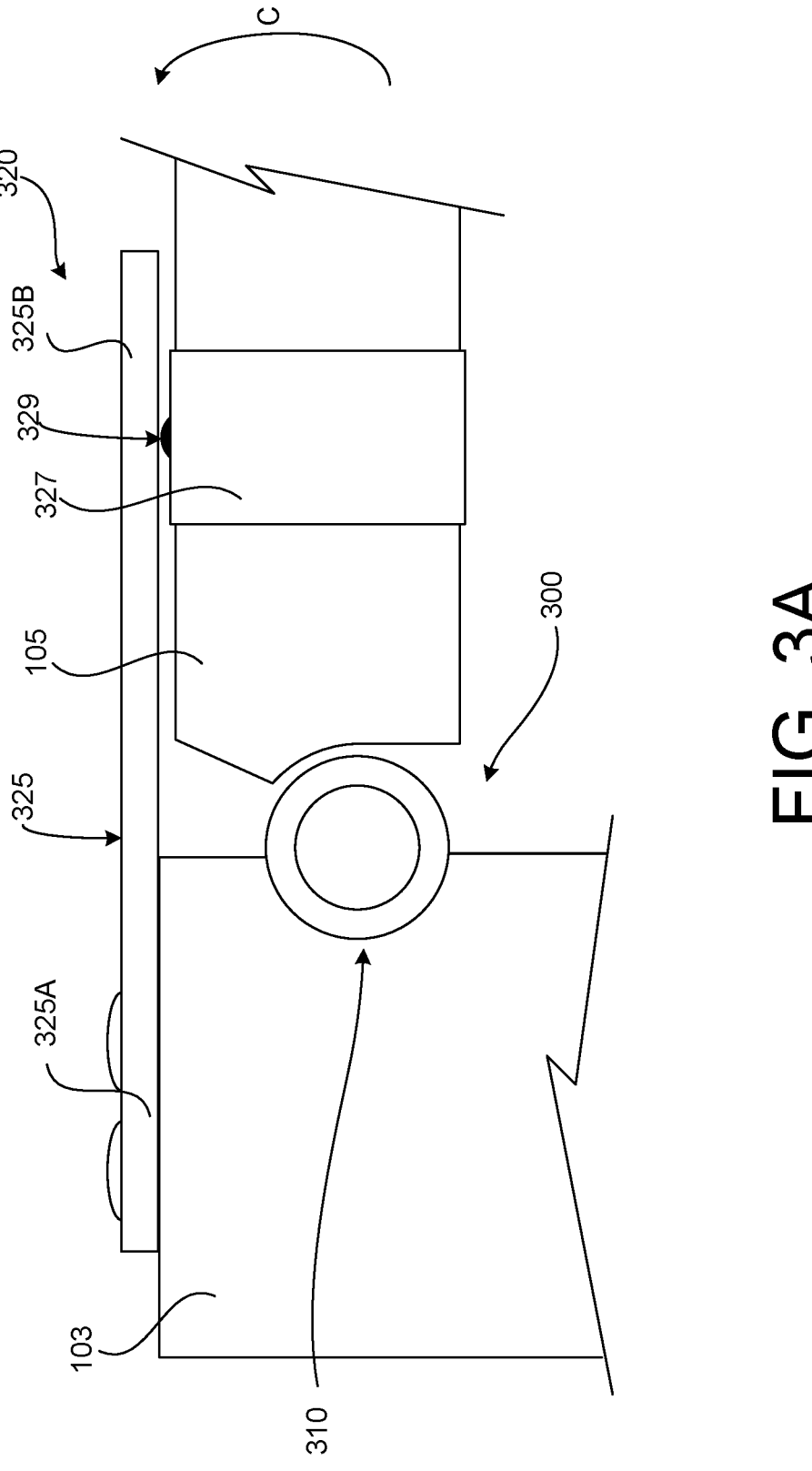
FIGS. 3A-3C illustrate an example hinge mechanism for use in a head mounted wearable device, in accordance with implementations described herein.
Figure 3B:
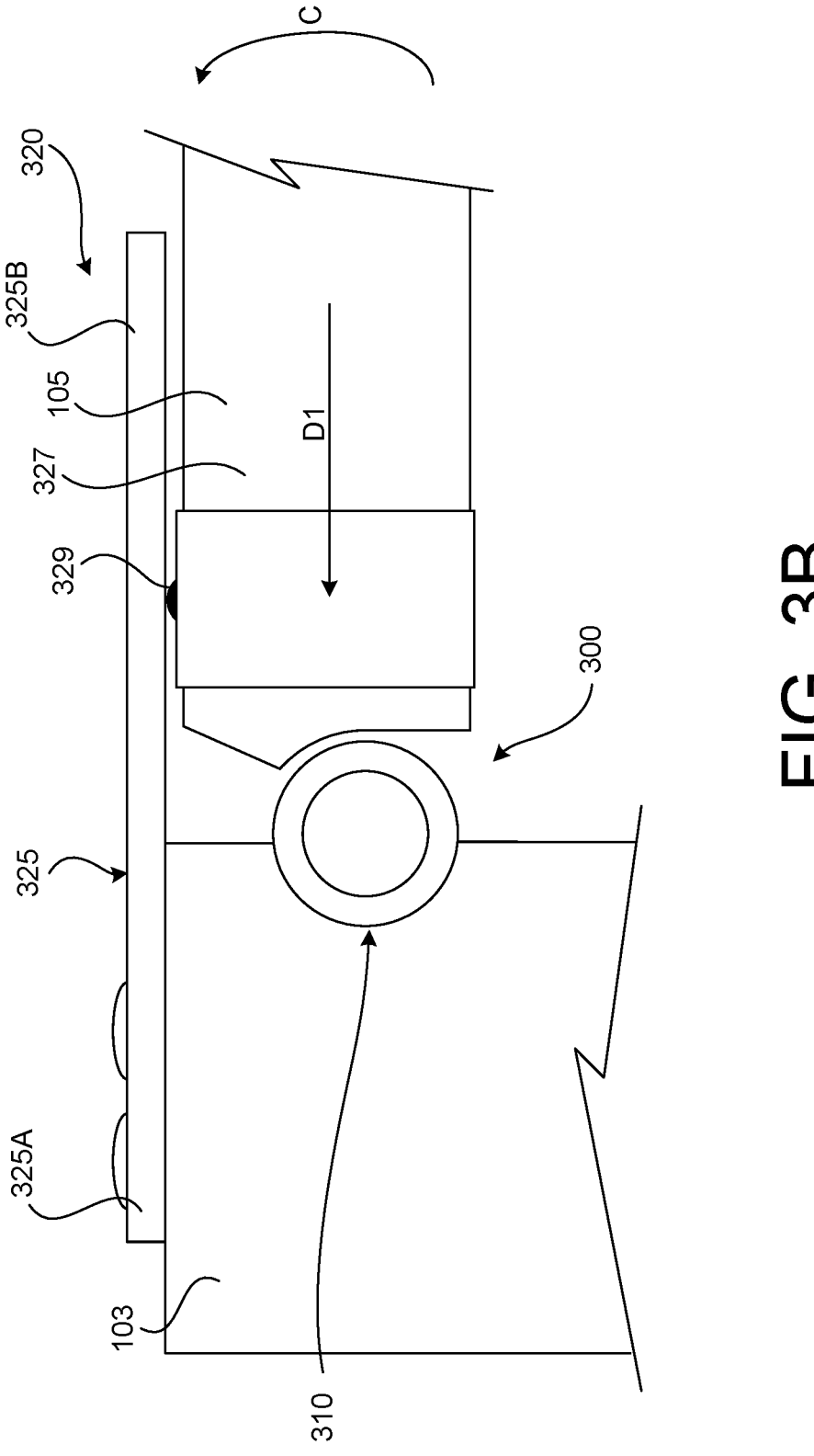
Figure 3C:
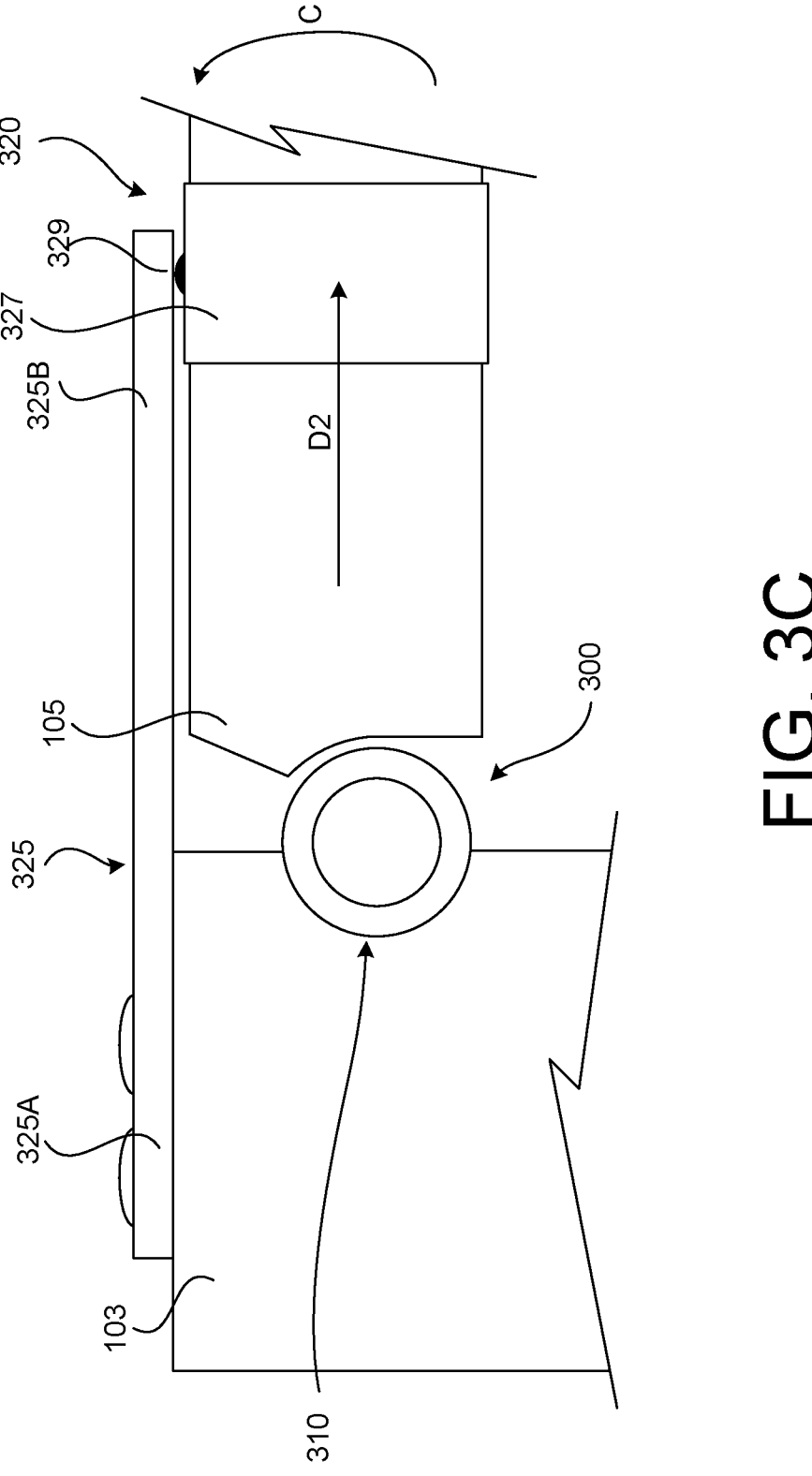

FIGS. 3A-3C illustrate an example hinge mechanism 300, in accordance with implementations described herein. FIGS. 3A-3C are cross-sectional views taken along line A-A of FIG. 1D, illustrating interaction between the rim portion 103 and the temple arm portion 105 at one or both of the hinge portions 110 of the frame 190. In particular, FIGS. 3A-3C are schematic views illustrating a top-down view of the hinge portion 110 of the frame 190, taken through corresponding portions of the rim portion 103 and the temple arm portion 105, just above a position of the example hinge mechanism 300. The example arrangement shown in FIGS. 3A-3C illustrates operation of the example hinge mechanism 300 at the hinge portion 110 defined between one of the rim portions 103 and the corresponding temple arm portion 105. The principles to be described herein can be similarly applied to operation of the example hinge mechanism 300 at the hinge portion 110 defined between the other of the rim portions 103 and the corresponding temple arm portion 105.

The example hinge mechanism 300 includes a rotation mechanism 310, and a biasing mechanism 320 coupled to the rotation mechanism 310. The rotation mechanism 310, in the form of a barrel hinge in the example shown in FIGS. 3A-3C, provides for rotation of the temple arm portion 105 relative to the rim portion 103. The biasing mechanism 320 includes a biasing member 325, in the form of a leaf spring coupled between the rim portion 103 and the temple arm portion 105. A first end portion 325A of the biasing member 325 is coupled to the rim portion 103. A collar 327 is positioned on the temple arm portion 105. A position of the collar 327 is adjustable along the temple arm portion 105, such that the collar 327 is movable or slidable along the temple arm portion 105 to a plurality of different positions with respect to a second end portion 325B of the biasing member 325. The second end portion 325B of the biasing member 325 is not fixed to the temple arm portion 105.

Rather, a contact portion 329 of the collar 327 is configured to selectively engage the second end portion 325B of the biasing member 325 as the temple arm portion 105 is rotated in the direction of the arrow C. As noted above, the temple arm portion 105 may rotate in the direction of the arrow C as the head mounted wearable device 100 is worn by the user, and a width of the head of the user causes the temple arm portions 105 to rotate outward, or spread, in the direction of the arrow C.

As noted above, a position of the collar 327, including the contact portion 329, is adjustable along the temple arm portion 105. Thus, the adjustment of the position of the collar 327, including the contact portion 329, along the length of the temple arm portion 105 defines an adjustment mechanism that provides for adjustment of an amount of biasing force output by the biasing member 325 and/or a point in the rotation of the temple arm portion 105 at which the biasing member 325 is engaged. FIG. 3A shows the collar 327 and contact portion 329 in a first position. FIG. 3B shows the collar 327 and contact portion 329 in a second position. FIG. 3C shows the collar 327 and contact portion 329 in a third position. Adjustment of the position of the collar 327, including the contact portion 329, along the temple arm portion 105 will, in turn, cause an adjustment in a point during the rotation of the temple arm portion 105 at which the contact portion 329/collar 327 (coupled to the temple arm portion 105) will engage the second end portion 325B of the biasing member 325. Adjustment of the position of the collar 327, including the contact portion 329, along the temple arm portion 105 may impact an amount of biasing force exerted by the biasing member 325 on the temple arm portion 105.

A point of engagement of the biasing mechanism 320 may be adjusted by the user and/or by a technician, by adjusting the position of the collar 327, including the contact portion 329, along the length of the temple arm portion 105. Similarly, an amount of force exerted on the side of the user's head by the temple arm portions 105 (due to the biasing force exerted by the biasing mechanism 320) may be adjusted by adjusting the position of the collar 327, including the contact portion 329, along the length of the temple arm portion 105. In the position shown in FIG. 3B, the collar 327/contact portion 329 has been moved from an intermediate position shown in FIG. 3A, inward, in the direction of the arrow D1, toward the rim portion 103, so that a greater biasing force is exerted on the temple arm portion 105. In the position shown in FIG. 3C, the collar 327/contact portion 329 has been moved from the intermediate position shown in FIG. 3A, outward, in the direction of the arrow D2, away from the rim portion 103, so that a lesser biasing force is exerted on the temple arm portion 105. Thus, the example biasing mechanism 320 including the biasing member 325 in the form of a leaf spring that can be selectively engaged along the length of the leaf spring, may provide a biasing mechanism 320 having a variable biasing rate, or a variable spring rate, based on a point of engagement between the contact portion 329 of the collar 327 and the biasing member 325. By varying the point of engagement and/or the biasing rate in this manner, essentially the same biasing force, and force exerted on the head of the user by the temple arm portions 105, can be achieved at different opening angles of the temple arm portions 105, thus accommodating different sized heads. As the biasing rate for a leaf spring of constant cross-section is proportional to the inverse of the length of the leaf cubed, movement in this manner may allow an amount of biasing force exerted by the biasing mechanism 320 to be easily adjusted by the user and/or by a technician.

In the example arrangement shown in FIGS. 3A-3C, the biasing member 325 is positioned on an outside of the rim portion 103 and the temple arm portion 105, simply for ease of discussion and illustration. The principles described can be similarly applied to a biasing member 325 positioned within the temple arm portion 105 and/or the rim portion 103, with a contact portion 329 positioned so as to selectively engage the biasing member 325 that is manipulatable by the user and/or by a technician from an outside of the temple arm portion 105. Similarly, in the example arrangement shown in FIGS. 3A-3C, the biasing member 325 includes the first end portion 325A thereof coupled to the front frame portion 102 of the frame 100, with the second end portion 325B of the leaf spring 325 not connected to/freely moving with respect to the temple arm portion 105 so as to selectively contact the contact portion 329 of the collar 327, simply for ease of discussion and illustration. In some examples, the second end portion 325B of the biasing member 325 may be coupled to the temple arm portion 105, with the first end portion 325B thereof moving freely/not coupled to the front frame portion 102, so as to selectively engage an adjustment device (for example, similar to the collar 327 and contact portion 329) provided on the front frame portion 102.

Figure 4A:
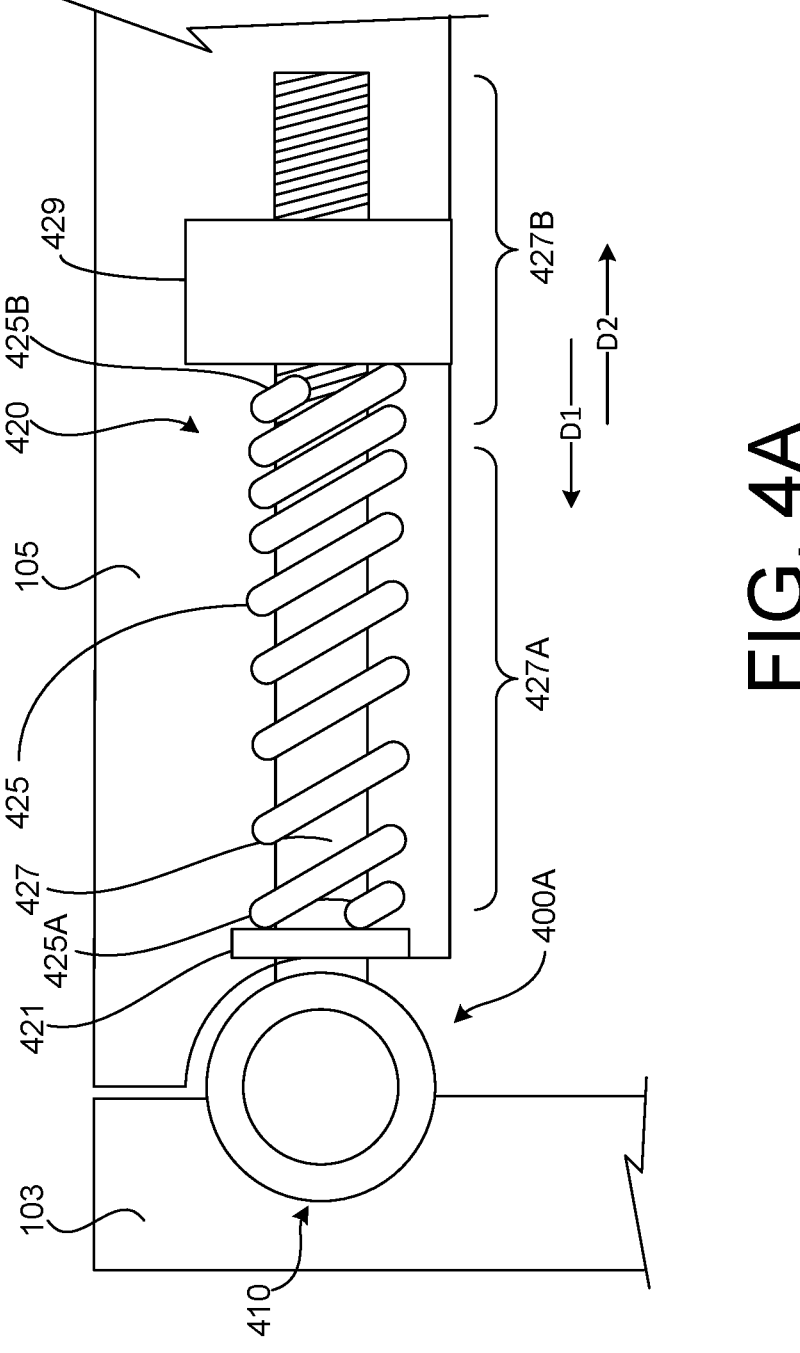
FIGS. 4A-4C illustrate an example hinge mechanism for use in a head mounted wearable device, in accordance with implementations described herein.
Figure 4B:
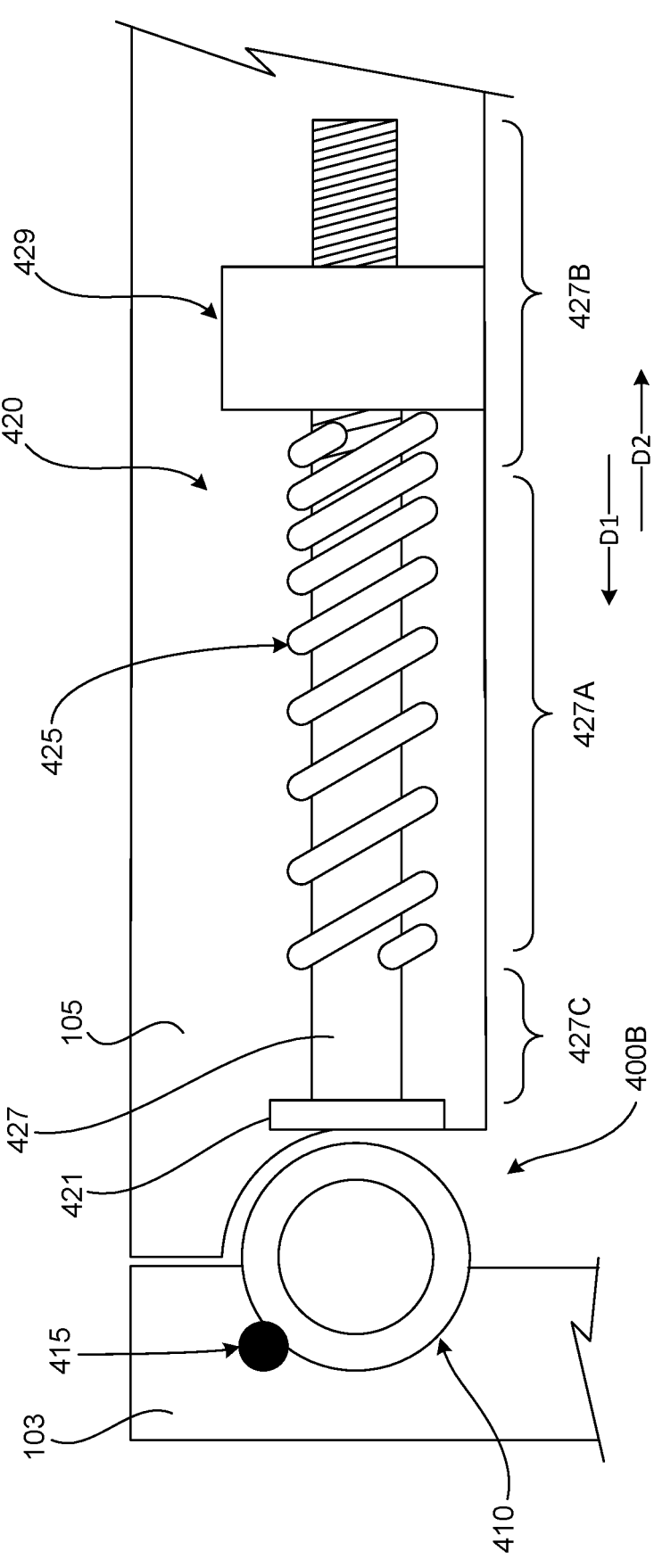
Figure 4C:
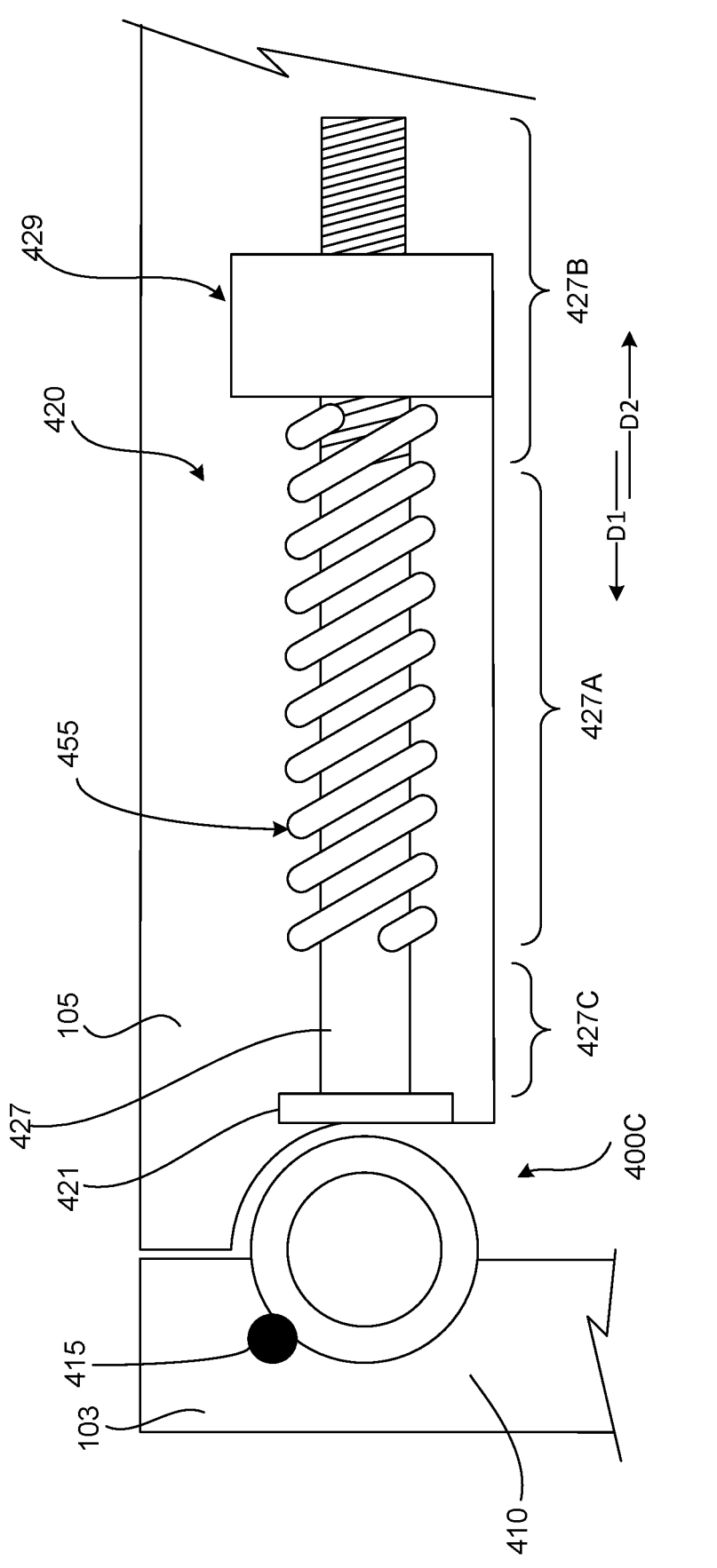

FIG. 4A illustrates an example hinge mechanism 400A, in accordance with implementations described herein. FIG. 4B illustrates an example hinge mechanism 400B, in accordance with implementations described herein. FIG. 4C illustrates an example hinge mechanism 400C, in accordance with implementations described herein. FIGS. 4A-4C are cross-sectional views taken along line A-A of FIG. 1D, illustrating interaction between the rim portion 103 and the temple arm portion 105 at the hinge portion 110 of the frame 190. In particular, FIGS. 4A-4C are a schematic views illustrating a top-down view of the hinge portion 110 of the frame 190, taken through corresponding portions of the rim portion 103 and the temple arm portion 105 just above a position of the respective hinge mechanisms 400A, 400B, 400C. The example arrangements shown in FIGS. 4A-4C illustrates operation of the example hinge mechanisms 400A, 400B, 400C, respectively, at the hinge portion 110 defined between one of the rim portions 103 and the corresponding temple arm portion 105. The principles to be described herein can be similarly applied to operation of the example hinge mechanisms 400A, 400B, 400C at the hinge portion 110 defined between the other of the rim portions 103 and the corresponding temple arm portion 105.

In the example arrangement shown in FIG. 4A, the example hinge mechanism 400A is coupled between the rim portion 103 and the temple arm portion 105 of the frame 190, allowing the temple arm portion 105 to rotate relative to the rim portion 103. The example hinge mechanism 400A includes a rotation mechanism 410, and a biasing mechanism 420 coupled to the rotation mechanism 410. The rotation mechanism 410, in the form of a barrel hinge, provides for rotation of the temple arm portion 105 relative to the rim portion 103. The biasing mechanism 420 includes a shaft 427 that is coupled to the rotation mechanism 410 and extends into an interior of the temple arm portion 105. In some examples, the shaft 427 extends into a hollow, or partially hollow, interior portion defined within the temple arm portion 105. A biasing member 425 is fitted on a first portion 427A of the shaft 427. In the example shown in FIG. 4A, the biasing member 425 is in the form of a coiled compression spring. In some examples, the biasing member 425 has a variable biasing rate. For example, the biasing member 425 may be in the form of a variable rate compression spring that outputs a variable spring rate. A first end portion 425A of the biasing member 425 abuts a flange 421, and a second end portion 425B of the biasing member 425 abuts a threaded collar 429. In the example arrangement shown in FIG. 4A, the flange 421 is coupled to an interior of the temple arm portion 105 and the threaded collar 429 is threadably engaged on a second, threaded portion 427B of the shaft 427. The second, threaded portion 427B of the shaft 427 may represent an adjustment range for adjusting an amount of compression of the biasing member 425 and a corresponding biasing force exerted on the rotation mechanism 410 by the biasing mechanism 420, and a corresponding force exerted by the temple arm portion 105 on the side of the user's head.

In the example shown in FIG. 4A, the biasing member 425 is a variable rate coil spring in which the spacing, or pitch, between adjacent coils is non-uniform. In the example shown in FIG. 4A, a pitch between adjacent coils in a first portion of the biasing member 425 associated with the first end portion 425A of the biasing member 425 is greater than a pitch between adjacent coils in a second portion of the biasing member 425 associated with the second end portion 425B of the biasing member 425. An initial load, or an initial displacement of the biasing member 425 can be adjusted by manipulation of the threaded collar 429. For example, a portion of the threaded collar 429 may be accessible at an outside of the temple arm portion 105 of the frame 190. A user, or a technician, may manipulate the threaded collar 429, causing the threaded collar 429 to move along the second, threaded portion 427B of the shaft 427. As the threaded collar 429 moves in a first direction (for example, inward, towards the rim portion 103, in the direction of the arrow D1) in response to manipulation, a distance between the threaded collar 429 and the flange 421 is reduced, and the biasing member 425 is further compressed, thus increasing compression of the biasing member 425 and increasing a biasing force, and a corresponding force exerted on the side of the user's head by the temple arm portion 105. Similarly, as the threaded collar 429 moves in a second direction (for example, outward, away from the rim portion 103, in the direction of the arrow D2) in response to manipulation, the distance between the threaded collar 429 and the flange 421 is increased, thus reducing compression of the biasing member 425 and reducing a biasing force, and a corresponding force exerted on the side of the user's head by the temple arm portion 105.

Manipulation of the threaded collar 429 as described may allow the user, or a technician, to increase or decrease the pre-load of the biasing mechanism 420, which will then impact the biasing rate output by the biasing mechanism 420 accordingly. This allows the force exerted on the side of the head of the user by the temple arm portion 105 to be adjusted for a particular opening angle of the temple arm portions 105 of the frame 190, to provide a comfortable fit for the user. The threaded collar 429 and movement thereof along the threaded, second portion 427B of the shaft 427, thus defines an adjustment mechanism that provides for adjustment of an amount of biasing force output by the biasing member 425 and/or a point in the rotation of the temple arm portion 105 at which the biasing member 425 is engaged.

The example hinge mechanism 400B shown in FIG. 4B is similar to the example hinge mechanism 400A shown in FIG. 4A. However, in the example arrangement shown in FIG. 4B, a third, gap portion 427C of the shaft 427 is formed between the first end portion 425A of the biasing member 425 and the flange 421. Additionally, in the example arrangement shown in FIG. 4B, a friction element 415 is positioned between a surface of the rotation mechanism 410 and a corresponding surface of the rim portion 103 of the frame 190. The example hinge mechanism 400C shown in FIG. 4C is similar to the example hinge mechanism 400B shown in FIG. 4B. However, in the example arrangement shown in FIG. 4C, the biasing mechanism 420 includes a biasing member 455 having a constant biasing rate. That is, in the example shown in FIG. 4C, the biasing member 455 is in the form of a constant rate compression spring mounted on the shaft 427.

In the examples shown in FIGS. 4B and 4C, adjustment of the threaded collar 429 on the second, threaded portion 427B of the shaft 427 may yield the third, gap portion 427C between the first end portion 425A of the biasing member 425 and the flange 421. Adjusting the threaded collar 429 in this manner may allow for an initial amount of angular deflection of the temple arm portion 105 of the frame 190 before the biasing mechanism 420 is engaged and a biasing force is generated. This may provide for an additional measure of adjustability of the temple arm portion 105 of the frame 190 when fitting for a particular user. The friction element 415 may provide damping as the temple arm portion 105 deflects, the biasing mechanism 420 engages and outputs a biasing force, and a corresponding force is exerted on the side of the user's head by the temple arm portion 105. The damping provided by the friction element 415 may reduce the sudden, jarring effect of engagement of the biasing mechanism 420.

Figure 5A:
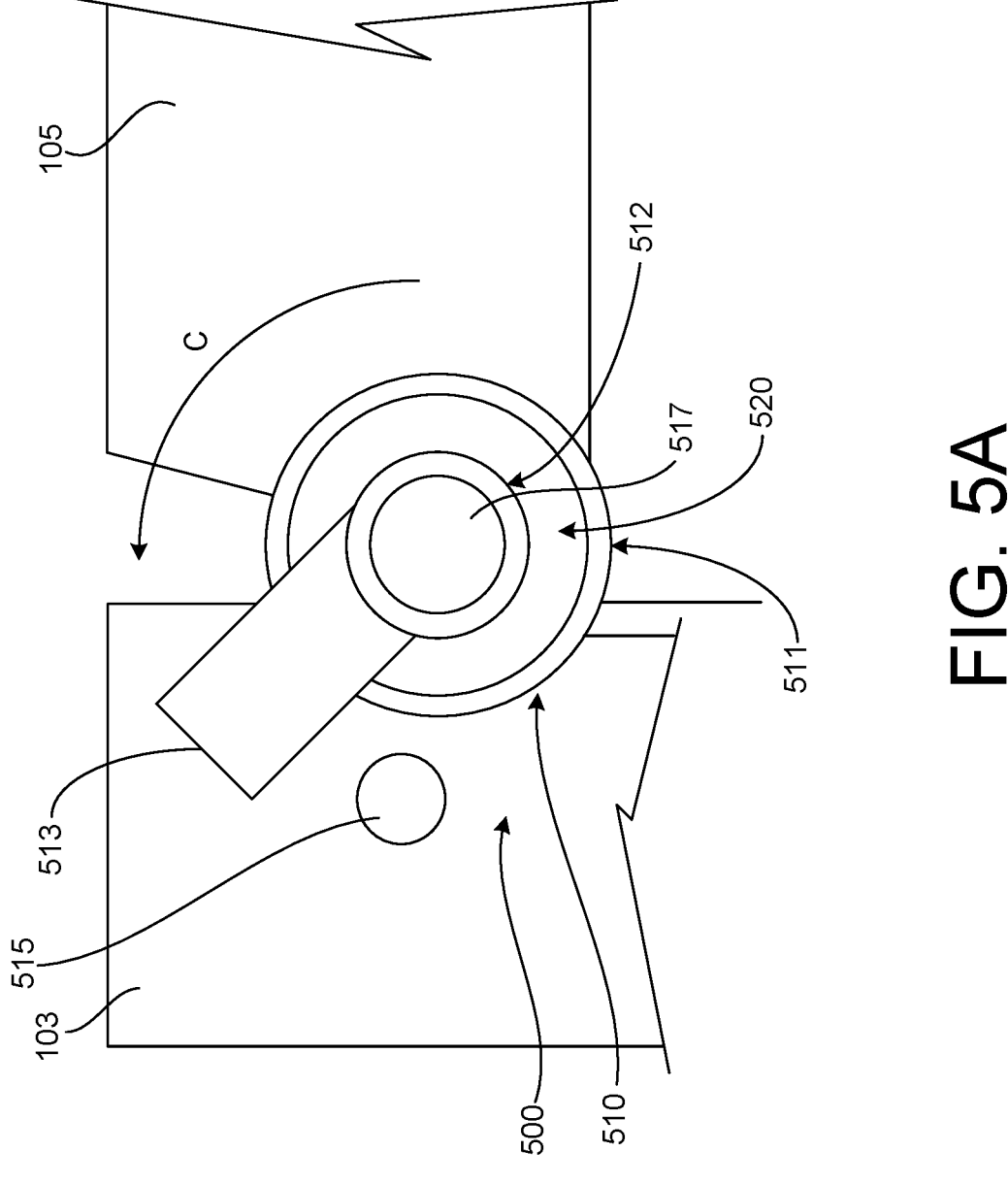
FIGS. 5A and 5B illustrate an example hinge mechanism for use in a head mounted wearable device, in accordance with implementations described herein.
Figure 5B:
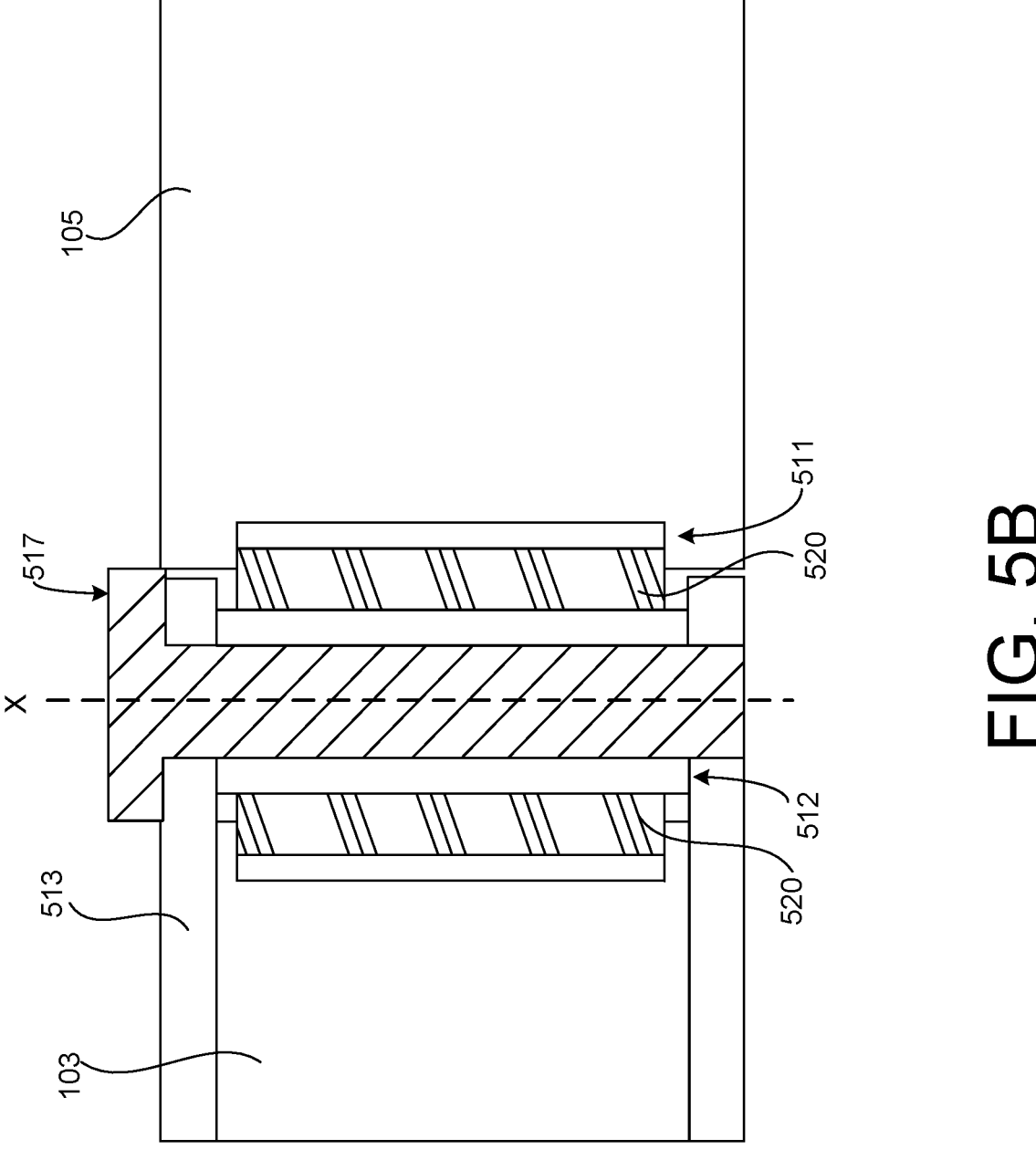

FIGS. 5A and 5B illustrate an example hinge mechanism 500, in accordance with implementations described herein. FIG. 5A is a schematic cross-sectional view taken along line A-A of FIG. 1D, illustrating interaction between the rim portion 103 and the temple arm portion 105 at the hinge portion 110 of the frame 190. FIG. 5B is a schematic cross-sectional view taken along line B-B of FIG. 1D. The example arrangements shown in FIGS. 5A and 5B illustrates operation of the example hinge mechanism 500 at the hinge portion 110 defined between one of the rim portions 103 and the corresponding temple arm portion 105. The principles to be described herein can be similarly applied to operation of the example hinge mechanism 500 the hinge portion 110 defined between the other of the rim portions 103 and the corresponding temple arm portion 105.

In the example arrangement shown in FIGS. 5A and 5B, the example hinge mechanism 500 is coupled between the rim portion 103 and the temple arm portion 105 of the frame 190, allowing the temple arm portion 105 to rotate relative to the rim portion 103. The example hinge mechanism 500 includes a rotation mechanism 510, and a biasing mechanism 520 coupled to the rotation mechanism 510. The rotation mechanism 510 is in the form of a bushing including a first ring 511 and a second ring 512 mounted so as to rotate on a central pin 517. The bushing including the first ring 511 and the second ring 512 may be concentrically arranged with the central pin 517 so as to rotate in the direction of the arrow C about a central axis X. The first ring 511 may be positioned circumferentially outside of the second ring 512, such that the first ring 511 is an outer ring, and the second ring 512 is an inner ring. The biasing mechanism 520 may be positioned between the first ring 511 and the second ring 512, and thus incorporated into the bushing defining the rotation mechanism 510. In some examples, the biasing mechanism 520 may be an elastomer material positioned between and engaged with the first ring 511 and the second ring 512. The elastomer material of the biasing mechanism 520 may exert a damping force that damps the rotational movement of the temple arm portion 105 in the direction of the arrow C. For example, as the first ring 511 rotates relative to the second ring 512, the biasing mechanism 520 (which has an outer surface contacting the first ring 511 and an inner surface contacting the second ring 512) is put in a shear state, with an amount of shear in the biasing mechanism 520 exerting a biasing force and/or a damping force. An arm 513 extends radially outward from the second ring 512. The hinge mechanism 500 may allow the temple arm portion 105 to rotate relatively freely with respect to the rim portion 103 until the arm 513 abuts, or engages a stopping mechanism 515 on the rim portion 103. The position of one or both of the second ring 512 and arm 513 and/or the first ring 511 may be adjusted by a user, or by a technician, to adjust a point at which the arm 513 will engage the stopping mechanism 515. In some examples, a holding mechanism (not shown in FIGS. 5A and 5B) may maintain the first ring 511 and/or the second ring 512 at a selected position. The holding mechanism may include, for example, one or more detents and protrusions, a ratcheting arrangement, fasteners and the like.

The example implementations described above illustrate various different hinge mechanisms, in accordance with implementations described herein, which may provide for rotatable coupling of a rim portion 103 and a temple arm portion 105 of a frame 190 of a head mounted wearable device 100. In the descriptions provided above, the rotatable coupling of one of the two temple arm portions 105 and the corresponding rim portion 103 is shown and described, simply for ease of discussion and illustration. The principles described above can be similarly applied to the rotatable coupling of the other of the two temple arm portions 105 to the corresponding rim portion 103 of the frame 190 of the head mounted wearable device 100.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:
1. A head mounted wearable device, comprising:
a frame, including:
a front frame portion;
an arm portion coupled to the front frame portion; and
a hinge mechanism rotatably coupling the arm portion to the front frame portion, the hinge mechanism including:

a rotation mechanism coupled between the front frame portion and the arm portion to rotatably couple the arm portion to the front frame portion of the frame;

a biasing mechanism coupled to the rotation mechanism and configured to exert a biasing force in response to rotation of the arm portion; and an adjustment mechanism coupled to at least one of the rotation mechanism or the biasing mechanism and configured to provide for adjustment of at least one of:

a biasing force exerted by the biasing mechanism; or a point of engagement of the biasing mechanism during rotation of the arm portion;

wherein the hinge mechanism includes a friction element configured to output a damping force in response to rotation of the arm portion relative to the front frame portion.

2. The head mounted wearable device of claim 1, wherein:

the rotation mechanism includes a hinge coupled between the front frame portion and the arm portion;

the biasing mechanism includes a spring; and the adjustment mechanism includes a collar that is movable along the arm portion and configured to move in first direction along the arm portion to increase a biasing force exerted by the spring and to move in a second, opposite direction along the arm portion to reduce the biasing force exerted by the spring.

3. The head mounted wearable device of claim 2, wherein the collar is movable to a plurality of positions along the arm portion, so as to selectively contact a corresponding portion of an end portion of the spring in response to rotation of the arm portion.

4. The head mounted wearable device of claim 2, wherein the collar includes a contact portion configured to selectively contact an end portion of the spring as the arm portion rotates relative to the front frame portion to selectively engage the end portion of the spring.

5. The head mounted wearable device of claim 2, wherein spring is a leaf spring and a second end portion of the leaf spring is movable relative to a first end portion of the leaf spring.

6. The head mounted wearable device of claim 1, wherein:

the rotation mechanism includes a hinge coupled between the front frame portion and the arm portion;

the biasing mechanism includes:

a shaft coupled to the hinge; and a compression spring coupled on a first portion of the shaft; and the adjustment mechanism includes:

a collar movably engaged with a second portion of the shaft and configured to move in first direction to increase a biasing force exerted by the compression spring, and to move in a second direction to reduce the biasing force exerted by the compression spring.

7. The head mounted wearable device of claim 6, further comprising a flange coupled to the arm portion, at a position corresponding to an end portion of the first portion of the shaft, wherein the compression spring is coupled on the first portion of the shaft between the flange and the collar.

8. The head mounted wearable device of claim 7, wherein a first end portion of the compression spring abuts the flange, and a second end portion of the compression spring abuts the collar.

9. The head mounted wearable device of claim 7, wherein, when the arm portion is in a first angular position, the biasing mechanism is in an at rest state and the compression spring is spaced apart from at least one of the flange and the collar.

10. The head mounted wearable device of claim 9, wherein when the arm portion is in a second angular position, the biasing mechanism is in an engaged state and a first end portion of the compression spring abuts the flange, a second end portion of the compression spring abuts the collar, and the compression spring is compressed between the flange and the collar, wherein the biasing mechanism does not exert a biasing force on the arm portion when the arm portion is moved between the first angular position and the second angular position.

11. The head mounted wearable device of claim 6, wherein the compression spring is a variable rate coil spring.

12. The head mounted wearable device of claim 6, wherein an engagement point of the biasing mechanism is adjustable based on a position of the collar on the second portion of the shaft.

13. The head mounted wearable device of claim 1, wherein the rotation mechanism, the biasing mechanism, the adjustment mechanism, and the friction element are incorporated into a bushing coupled between the front frame portion and the arm portion, the bushing including:

a first ring defining an outer surface of the bushing;

a second ring concentrically arranged within the first ring;

an elastomer biasing member positioned in a space between the first ring and the second ring;

a pin concentrically arranged within the second ring; and an arm extending radially outward from an end portion of the second ring.

14. The head mounted wearable device of claim 13, wherein the elastomer biasing member is configured to exert a biasing force on the first ring and the second ring in response to rotation of the arm portion relative to the front frame portion of the frame.

15. The head mounted wearable device of claim 13, wherein, in response to rotation of the arm portion relative to the front frame portion, an elastomer material of the elastomer biasing member is in a shear state that exerts corresponding shear forces on the first ring and the second ring.

16. The head mounted wearable device of claim 13, further comprising a stopping mechanism provided in the front frame portion, wherein the arm is configured to selectively engage the stopping mechanism during rotation of the arm portion, and corresponding rotation of the bushing, to selectively restrict rotation of the arm portion relative to the front frame portion.

17. A hinge mechanism, comprising:

a rotation mechanism coupled between a front frame portion and an arm portion of a frame;

a biasing mechanism coupled to the rotation mechanism and configured to exert a biasing force in response to rotation of the arm portion; and an adjustment mechanism coupled to at least one of the rotation mechanism or the biasing mechanism and configured to provide for adjustment of:

a biasing force exerted by the biasing mechanism;

a point of engagement of the biasing mechanism during rotation of the arm portion relative to the front frame portion; and a friction element configured to output a damping force in response to rotation of the arm portion relative to the front frame portion.

18. The hinge mechanism of claim 17, wherein:

the rotation mechanism includes a hinge coupled between the front frame portion and the arm portion;

the biasing mechanism includes a spring; and the adjustment mechanism includes a collar that is movable along the arm portion, and configured to move in first direction along the arm portion to increase a biasing force exerted by the spring and to move in a second, opposite direction along the arm portion to reduce the biasing force exerted by the spring.

19. The hinge mechanism of claim 17, wherein:

the rotation mechanism includes a hinge coupled between the front frame portion and the arm portion;

the biasing mechanism includes:

a shaft coupled to the hinge; and a compression spring coupled on a first portion of the shaft; and the adjustment mechanism includes:

a collar movably engaged with a second portion of the shaft and configured to move in first direction to compress the compression spring and increase a biasing force exerted by the compression spring, and to move in a second direction to release the compression spring and reduce the biasing force exerted by the compression spring.

20. The hinge mechanism of claim 17, wherein the rotation mechanism, the biasing mechanism, the adjustment mechanism and the friction element are incorporated into a bushing coupled between the front frame portion and the arm portion, the bushing including:

a first ring defining an outer surface of the bushing;

a second ring concentrically arranged within the first ring;

an elastomer biasing member positioned in a space between the first ring and the second ring and configured to exert a biasing force on the first ring and the second ring;

a pin concentrically arranged within the second ring; and an arm extending radially outward from an end portion of the second ring.

* * * * *